April 10, 1962 R. L. SCOTT 3,028,900
SAFETY WHEEL CONSTRUCTION
Filed Jan. 13, 1961

Roy L. Scott,
INVENTOR.
WHANN & McMANIGAL
Attorneys for Applicant by Robert M. McManigal

United States Patent Office 3,028,900
Patented Apr. 10, 1962

3,028,900
SAFETY WHEEL CONSTRUCTION
Roy Lee Scott, 16108 S. Atlantic Ave., Compton, Calif.
Filed Jan. 13, 1961, Ser. No. 82,638
10 Claims. (Cl. 152—158)

The present invention relates generally to a wheel assembly for pneumatically tired vericles, and is more particularly concerned with a safety wheel for preventing collapse of the tire in the event of a puncture or a blowout.

Heretofore, there has been a general appreciation of the need for a safety wheel which could be mounted within the tire structure, and which would prevent collapse of the tire in the event of a puncture or a blowout. Such a device will prevent damage to the tire, but more important is that a safety wheel of this character prevents loss of control of the vehicle and consequent possible property damage, loss of life or physical injury to the driver or other persons. A number of arrangements have been suggested for safety wheels, but the conventional arrangements are relatively quite complicated and entail the use of a considerable number of parts which have been designed for the primary purpose of providing an inner sectional ring structure capable of being assembled within the tire on the tire supporting rim. Such a ring structure has in the main been unsatisfactory, and did not provide the desirable strength or simplicity of use to make it commercially practical.

Having the foregoing in mind, the present invention has for one object the provision of a simplified safety wheel of unique construction to permit the surrounding tire to be quickly and easily positioned around the periphery of the safety wheel, the diameter of the safety wheel being greater than that of the inner diameter of the tire.

A further object of the invention is to provide an improved safety wheel structure, wherein the vehicle weight, upon tire diflation, will be carried directly to the wheel hub.

A still further object is to provide a safety wheel of simple construction, which conforms in general to conventional wheel assembly structures, and in which the assembly provides an extremely rigid and strong structure having a minimum of components.

Further objects of the invention will be brought out in the following part of the specification, wherein detailed description is for the purpose of fully disclosing the invention without placing limitations thereon.

Referring to the accompanying drawings, which are for illustrative purposes only:

Figure 1:
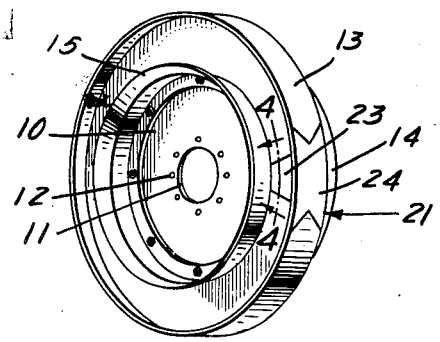
FIG. 1 is a perspective view of a safety wheel embodying the features of the present invention, the tire being removed.

Referring more specifically to the drawings, for illustrative purposes, the safety wheel of the present invention is shown in FIG. 1 as including a wheel disc 10 which is centrally apertured, as indicated at 11, and provided with a plurality of circumferentially spaced openings 12 by means of which the wheel disc may be secured to a brake drum or wheel hub connected with a supporting axle. Peripherally, the wheel disc is provided with a circumferentially extending right-angled flange 13.

The wheel disc 10 extends between an inner rim member 14 and an outer rim member 15 which cooperate to form a mounting support for a pneumatic tire assembly 16 which is illustrated as being of the tubeless type. As assembled on the rim members, the tire surrounds the flange 13, which is shown as being covered with an outer layer 17 of rubber or other suitable material so that a deflated tire will be protected against damage. As shown in dotted lines in FIG. 2. a punctured or deflated tire would be deformed into engagement with this layer and the vehicle weight supported upon the wheel disc 10.

Figure 2:
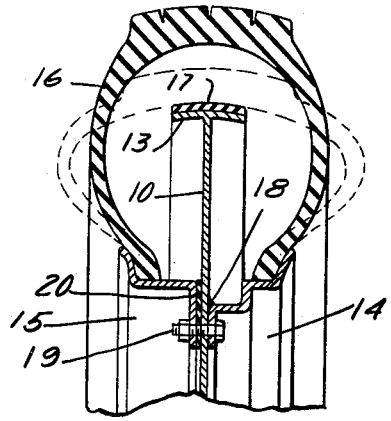
FIG. 2 is an enlarged fragmentary view including a radial section through a mounted tire and associated parts of the wheel assembly.

The rim members may be removably connected to the wheel disc 10, however, as illustrated in FIG. 2, the inner rim member is disclosed as being permanently affixed to the wheel disc as by welding, for example, circumferentially along the contact line as indicated by the numeral 18. The outer rim member 15 is preferably secured in mounted position by holding bolts and securing nuts 19, a ring gasket 20 being interposed between the rim member and the wheel disc so as to seal the assemblage against leakage.

Figure 3:
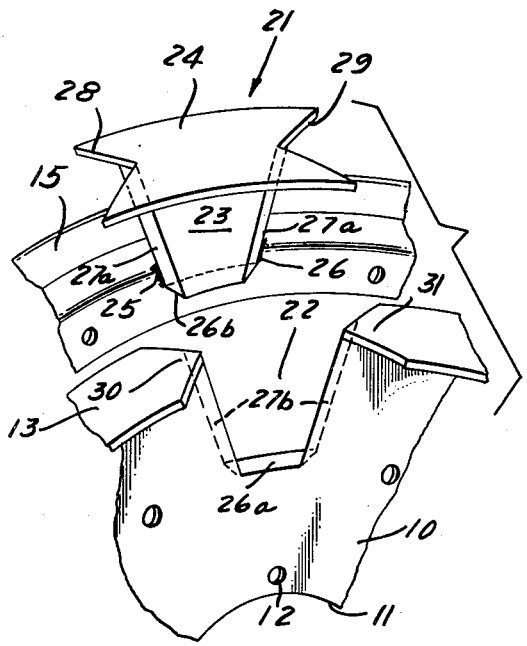
FIG. 3 is an enlarged fragmentary exploded view showing details of the cooperable wheel disc sections.
Figure 4:
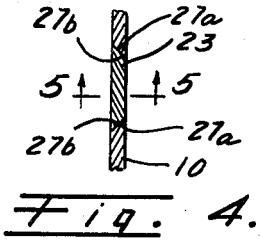
FIG. 4 is a detail sectional view taken substantially on line 4—4 of FIG. 1.
Figure 5:
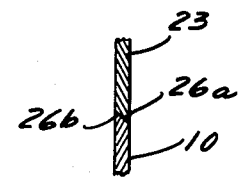
FIG. 5 is a detail sectional view taken substantially on line 5—5 of FIG. 4.

As will be observed in FIG. 2, the wheel disc has a diameter which is greater than the inner bead diameter of the tire 16. Some way must, therefore, be provided in order to enable placement of the tire in a position surrounding the periphery of the wheel disc. This could be done, of course, by providing a plurality of arcuate wheel disc sections which could be assembled to form a complete wheel disc. However, such an arrangement is of an inherently weak construction, and therefore undesirable. In the present invention, this problem has been solved in a unique manner by providing a small removable peripheral section, as generally indicated by the numeral 21, in the wheel disc. The removable section 21, upon being removed, leaves a notch or opening 22 at the periphery of the wheel disc, as shown in FIG. 3. The notch 22 permits a side wall of the tire to be moved therethrough in such a manner that the peripheral portion of the wheel disc may be in effect threaded into the interior of the tire 16. After the tire is thus positioned around the periphery of the wheel disc, means are provided for replacing the section 21 and interlocking it against removal in the notch or opening 22, as will hereinafter be explained in detail.

As clearly shown in FIG. 3, the section 21 includes a wedge shaped disc portion 23 and an arcuate flange portion 24. The section 21 is secured to the outer rim member 15 so as to project therefrom. This may be done by welding at points 25 and 26 or by other conventional means. The section as thus mounted is arranged to appropriately fit into the opening 22 when the outer rim member is mounted on the wheel disc 10 as shown in FIG. 1.

In order to interlock the section 21 in its position closing the notch or opening 22, the bottom of the notch 22 is provided with a bevelled edge 26a which is adapted to fit and interlock behind a complementary bevelled edge 26b at the bottom of the wedge shaped disc portion 23 of the section 21. Also, the side edges of the portion 23 are provided with oppositely inclined bevels 27a which are adapted to respectively overlie complementary bevels 27b of the disc edges forming the notch 22. Moreover, the flange portion 24 has its respective ends provided with the notches 28 and 29 adapted to respectively receive pointed ends 30 and 31 of the flange 13. With this arrangement, an extremely strong structure is provided at the point where the peripheral section is positioned, and provides in effect a continuous wheel disc periphery, when the outer rim member 15 is secured in position with the section 21 in the notch 22.

Various modifications may suggest themselves to those skilled in the art without departing from the spirit of my invention, and, hence, I do not wish to be restricted to the specific form shown or uses mentioned, except to the extent indicated in the appended claims.

I claim:

1. A vehicle safety wheel, comprising: a wheel disc having a central hub attaching part, a tire supporting rim structure carried by said disc including a removable annular section on one side of said disc, said disc having a peripheral rail portion radially extending beyond said rim structure and having a notch opening therein enabling mounting of the rail portion within the tire, and a radially projecting part on said removable annular section of said disc for closing said notch opening in the mounted position of said section.

2. A vehicle safety wheel, comprising: a wheel disc having a central hub attaching part, a tire supporting rim structure carried by said disc including a remoable annular section on one side of said disc, said disc having a peripheral rail portion radially extending beyond said rim structure and having a notch opening therein enabling mounting of the rail portion within the tire, and a radially projecting part on said removable annular section of said disc for closing said notch opening in the mounted position of said section, said radially projecting part and associated peripheral rail portion having interlocking engagement.

3. A vehicle safety wheel, comprising: a wheel disc having a central hub attaching part, a tire supporting rim structure carried by said disc including a removable annular section on one side of said disc, said disc having a peripheral rail portion radially extending beyond said rim structure and having a notch opening therein enabling mounting of the rail portion within the tire, a radially projecting part on said removable section providing a fixed unitary structure, and in which the projecting part closes said notch opening in the mounted position of said section, and means carried by said projecting part for interlocking engagement with said peripheral rail portion.

4. A vehicle safety wheel, comprising: a wheel disc having a peripheral rail portion adapted to extend into a surrounding tire, said peripheral rail portion having an open section therein, and a tire rim member removably mountable on said wheel disc and having a fixedly secured part thereof for closing said open section in the mounted position thereof, said part being conformed generally to said rail portion.

5. A vehicle safety wheel, comprising: a wheel disc having a peripheral rail portion adapted to extend into a surrounding tire, said peripheral rail portion having a removable section, and a tire rim member removably mountable on said wheel disc, and having said removable section fixedly secured thereto to provide a unitary structure, whereby to complete the peripheral rail portion when the tire rim member is mounted on the wheel disc.

6. A vehicle safety wheel, comprising: a wheel disc having a peripheral rail portion adapted to extend into a surrounding tire, said peripheral rail portion having a removable interlocking section, and a tire rim member removably mountable on said wheel disc, and having said removable section fixedly secured thereto to provide a unitary structure, whereby to complete the peripheral rail portion when the tire rim member is mounted on the wheel disc.

7. A vehicle safety wheel, comprising: a structure including an annular radially extending wheel disc having a right-angled peripheral flange adapted to be positioned within a surrounding tire, said structure being composed of a circumferentially continuous main section adapted for connection to a wheel hub and a removable peripheral section in which a portion of said disc and a portion of said flange are integrally formed, and said portions having edges arranged for interlocking engagement with corresponding portions of said main section, means for securing said peripheral section against removal, and a tire rim member removably mountable on said disc.

8. A vehicle safety wheel, comprising: a structure including an annular radially extending wheel disc having a right-angled peripheral flange adapted to be positioned within a surrounding tire, said structure being composed of a circumferentially continuous main section adapted for connection to a wheel hub and a removable peripheral section in which a portion of said disc and a portion of said flange are integrally formed, and said portion having bevelled edges arranged for interlocking overlapping engagement with associated edges of corresponding portions of said main section, means for securing said peripheral section against removal, and a tire rim member removably mountable on said disc.

9. A vehicle safety wheel, comprising: a structure including an annular radially extending wheel disc having a right-angled peripheral flange adapted to be positioned within a surrounding tire, said structure being composed of a circumferentially continuous main section adapted for connection to a wheel hub and a removable peripheral section in which a portion of said disc and a portion of said flange are integrally formed, and said portion having edges arranged for interlocking engagement with corresponding portions of said main section, and tire rim means removably mountable on said disc, and including said removable section.

10. A vehicle safety wheel, comprising: a structure including an annular radially extending wheel disc having a right-angled peripheral flange adapted to be positioned within a surrounding tire, said structure being composed of a circumferentially continuous main section adapted for connection to a wheel hub and a removable peripheral section in which a portion of said disc and a portion of said flange are integrally formed, and said portion having bevelled edges arranged for interlocking overlapping engagement with associated edges of corresponding portions of said main section, said removable peripheral section being of a radial depth sufficient to enable circumferential movement of one side of said tire therethrough and position it around said main section, and tire rim means removably mountable on said disc.

References Cited in the file of this patent

UNITED STATES PATENTS

| 1,693,192 | Colgrove | Nov. 27, 1928 |
| 2,165,810 | Paselk | July 11, 1939 |